Fig. 1 (Record Mode)

Fig. 2

Fig. 3 (Reproduce Mode)

INVENTOR:
Flavio S.C. Branco

By Keith D. Beecher
Attorney.

Fig. 4 (Dynamic Phase Shifter) (Resolver)

INVENTOR:
Flavio S.C. Branco

By Keith D. Beecher
Attorney

July 4, 1967  F. S. C. BRANCO  3,329,876
TAPE CONTROL SYSTEM

Filed Nov. 20, 1964  6 Sheets-Sheet 4

INVENTOR:
Flavio S. C. Branco
By Keith D. Beecher
Attorney

Fig. 10 (Ramp Generator -46-)

Fig. 11 (1μs Pulse Former -34-)

INVENTOR:
Flavio S. C. Branco
By Keith D. Beecher
Attorney.

July 4, 1967  F. S. C. BRANCO  3,329,876
TAPE CONTROL SYSTEM
Filed Nov. 20, 1964  6 Sheets-Sheet 6

Fig. 12 (Transfer Phase Detector -40-)

Fig. 13 (Coarse Speed Detector -60-)

Fig. 14 (Phase Error Detector -48-)

INVENTOR:
Flavio S. C. Branco
By Keith D. Beecher
Attorney

# United States Patent Office 3,329,876
Patented July 4, 1967

3,329,876
TAPE CONTROL SYSTEM
Flavio S. C. Branco, Van Nuys, Calif., assignor to Winston Research Corporation, Los Angeles, Calif., a corporation of California
Filed Nov. 20, 1964, Ser. No. 412,704
7 Claims. (Cl. 318—7)

ABSTRACT OF THE DISCLOSURE

Describes an improved speed control servo system for providing uniformity of tape speed and tension between recording and playback in magnetic-tape recorder-reproducer equipment. The invented servo system allows independent control of each of two drive means used in a double capstan type of assembly. Timing signals, recorded on magnetic tape during the record mode, are compared to a standard frequency source, and form the basis for independently controlling the speed of the two drive means, there being a separate track of timing signals for each drive means. In addition, the speed control of one of the two drive means is adjusted by a regulating means when the tape tension varies from a predetermined value. The regulating means comprises a dynamic phase shifter interposed between the standard frequency source and the servo control system, and a motor means which is mechanically coupled to the dynamic phase shifter and electrically coupled to one of the drive means.

---

The present invention relates to an improved servo system for controlling the speed of an electric motor, and it relates more particularly to an improved speed control servo system for controlling the speed of a magnetic tape in a magnetic recorder/reproducer.

As described in copending application Ser. No. 282,980 filed May 24, 1963 in the name of the present inventor (now U.S. Patent No. 3,295,032 issued Dec. 27, 1966 and assigned to the same assignee as this invention), it is most important that the magnetic tape, or equivalent recording medium, in a magnetic recorder/reproducer be drawn past the electro-magnetic transducer heads of the machine with constant linear velocity during the record mode. Any variation in the speed of the tape during the recording of the information, produces a distorting frequency or phase modulation in the recorded information.

Many attempts have been made in the past to devise a magnetic recorder system in which the magnetic tape is drawn with constant speed past the transducer heads. However, these attempts have usually involved expensive and complicated speed regulating systems, and expensive high inertia drive motors.

It is the usual practice to record timing signals on the tape during the record mode, so that any variations in tape speed during that mode can be sensed during reproduction in order that compensating variations in tape speed can be effected.

The servo control system described in the aforementioned copending application is particularly adapted to a double capstan type of magnetic drive system, such as disclosed and claimed in copending application Ser. No. 250,084 filed Jan. 8, 1963, now Patent No. 3,225,233. In the disclosed system, two capstan drive assemblies are used for the tape, these being spaced from one another along the tape path. The forward capstan assembly is driven at a slightly higher speed than the rear capstan assembly during the record mode so that a tension is exerted on the tape between the two capstan drive assemblies. The record and reproduce heads for the mechanism are positioned to engage the tape between the two capstan assemblies. The control system of the present invention is also particularly adapted to the double capstan type of capstan drive system.

As mentioned, it is the usual practice in tape recorders, especially of the high precision type, to provide a timing signal of a constant frequency directly on the tape. This control signal is utilized to provide a reference signal for speed control purposes, so as to enable the tape speed during reproduction to be compensated for slight variations in tape speed during the record mode. In the double capstan type of system, it is desirable to sense the speed control signal on the tape at two distinct locations, adjacent the respective capstans. This is because variations in the frequency of the control signal at a point adjacent the second capstan, for example, does not necessarily indicate a required compensation in the speed of the first capstan.

The signal sensed adjacent the first capstan in the prior art system can then be used to control the speed of the first capstan, and the signal sensed adjacent the second capstan can be used to control the speed of the second capstan. By this expedient, the speed of that portion of the tape between the two capstans can be controlled in the desired manner, and under ideal conditions, that portion of the tape will not be subject to stresses or strains.

However, in the recording of the aforesaid control signal, a normal tape flutter produces variations in the frequency of the control signal. When such a control signal is used for speed control purposes in a double capstan system, and when the control is sensed at the two positions mentioned above, the tape tension between the capstans will not be held constant. This is because the sensing of the control signal at the two locations produces spurious error signals which are produced due to the flutter-produced variations in frequency or phase of the control signal. Should flutter become serious, not only is the control of the tape subject to spurious variations, but also there is a likelihood of tape breakage.

As will be described, the improved system of the present invention utilizes two distinct control signals which are recorded on different tracks of the tape. The first control signal is recorded adjacent the first capstan in the recorder and is sensed by the head adjacent the first capstan in the reproducer; and the second control signal is recorded adjacent the second capstan in the recorder and is sensed by the head adjacent the second capstan in the reproducer. The servo controls for the two capstans in the reproducer are referenced to independent control timing tracks on the tape, and the effect of flutter in the control signals does not create the problems encountered in the aforementioned system.

An object of the present invention, therefore, is to provide an improved servo control system which is intended particularly to use in the dual capstan type of magnetic recorder, and which is capable of controlling the drive of the magnetic tape with a high degree of precision, and yet which does not subject the tape to spurious stresses and strains.

Another object of the invention is to provide such an improved control system which is relatively simple and inexpensive to construct, and which may be readily incorporated into magnetic recorders/reproducers.

A further object of the invention is to provide such an improved control system which enables the dynamic tension in the tape to be held essentially constant, as the tape is drawn past the record/reproduce heads of the dual capstan type of tape recorder/reproducer, so as to avoid time displacement distortions in the signals reproduced by the mechanism.

Other objects and advantages of the invention will become apparent from a consideration of the following description, when the description is taken in conjunction with the accompanying drawings, in which:

As mentioned above, the block representation of FIGURE 1 shows schematically a tape recorder, during the record mode when data is recorded on the various tracks of a tape 14. During that mode, it is usual to record a timing signal of constant frequency on a timing track of the tape. This timing track is usually disposed near the center of the tape, to avoid the effects of skew.

Figure 1:
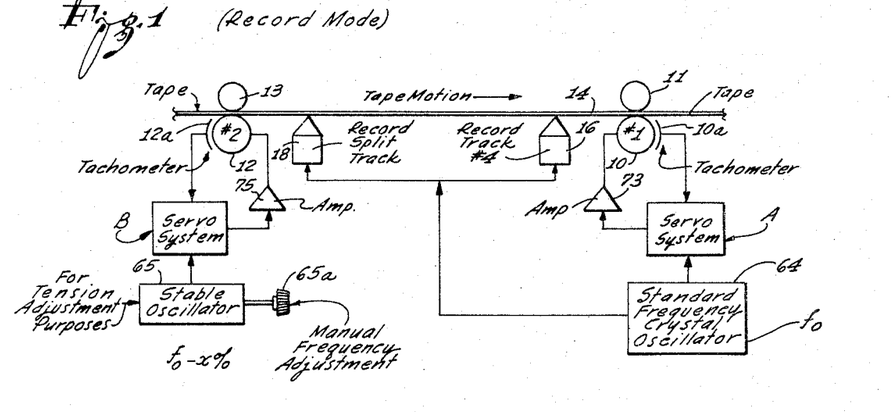
FIGURE 1 is a schematic block diagram representative of the improved control system of the invention, as used in a dual capstan type of tape recorder, during which appropriate timing signals are recorded on the tape.
Figure 2:
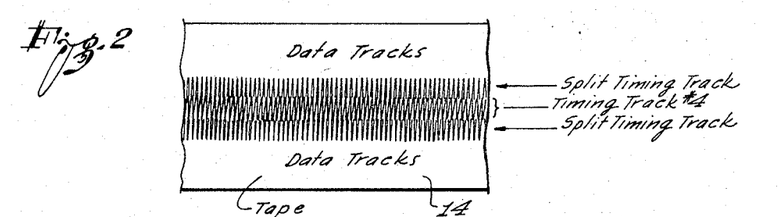
FIGURE 2 is a fragmentary schematic representation of a tape including a first timing track and a second split-timing track, in accordance with the concepts of the invention.

In accordance with the concepts of the present invention, a pair of record/reproduce heads 16 and 18 are disposed in spaced relationship along the path of the tape 14. The head 16, for example, is magnetically coupled to a central track of the tape 14, designated for convenience as track #4. The head 18, on the other hand, is coupled to two portions of the tape 14 on opposite sides of the track #4, so as to provide a split timing track. The heads 16 and 18 derive a standard frequency signal of frequency, for example, $f_0$, from a standard frequency crystal oscillator 64. The oscillator 64 may be connected and constructed in any known manner.

It will be appreciated, therefore, that as the tape 14 is drawn past the heads 16 and 18 by a pair of spaced capstans 10 and 12, the head 16 will record a timing signal in the track #4, and the head 18 will record the same timing signal in the split track on the tape.

The capstans 10 and 12 are of any usual type, and they are spaced along the tape 14 in accordance with usual practice of the dual capstan concept. A pair of pucks 11 and 13 may be selectively controlled to be moved against the capstans 10 and 12, so as to squeeze the tape 14 against the respective capstans, and cause it to be drawn along its selected path.

A usual motor is associated with each of the capstans 10 and 12, and these motors are driven by respective amplifiers 73 and 75. The amplifiers, in turn, are driven by corresponding servo systems designated A and B in FIGURE 1. A tachometer 10a is associated with the capstan 10, and a tachometer 12a is associated with the capstan 12. These tachometers may be optical, magnetic, or any other known type, and they produce output signals representative of the speeds of the respective capstans. The servo systems A and B respond to the output signals from the tachometers to control the speeds of the capstans, as will be described in some detail herein.

For example, the servo system A compares the tachometer signal with the signals from the standard frequency crystal oscillator 64 to derive an appropriate drive signal for the capstan motor 20, so that the motor 20 may be driven at a controlled speed.

A stable oscillator 65 is coupled to the servo system B, and the output from the stable oscillator is compared with the tachometer signals from the tachometer 12a to provide a control for the capstan 12. The capstan 12 is driven at a slightly lower speed than the capstan 10 during the record mode, so that the tape 14 may be drawn with a predetermined tension across the data heads (not shown). The data heads may be included in respective head stacks which also includes the heads 16 and 18. The data heads are positioned between the capstans 10 and 12, and they sense different tracks on the tape 14.

A manual adjustment 65a may be provided for the stable oscillator 65. This manual adjustment may change the frequency of the stable oscillator by a predetermined amount, so as to control the tension of the tape between the capstan assemblies during the record mode.

It will be appreciated, therefore, that a timing signal for the tape 14 is recorded in a first track of the tape by the head 16 at a position adjacent the capstan 10. At the same time, the same timing signal is recorded on the tape in the split timing track by the head 18 at a position adjacent the capstan 12.

Therefore, by means of the dual timing signals of the system of the invention, the head 16 records a timing signal, during the record mode, adjacent the capstan 10, and having variations indicative of variations in tape speed at that point. This very signal is sensed at the same point by the head 16 during the reproduce mode. At the same time, the head 18 records a timing signal in a different track during the record mode, adjacent the capstan 12, and having variations indicative of variations in tape speed at that point. This latter signal is sensed by the head 18 during the reproduce mode.

Figure 3:
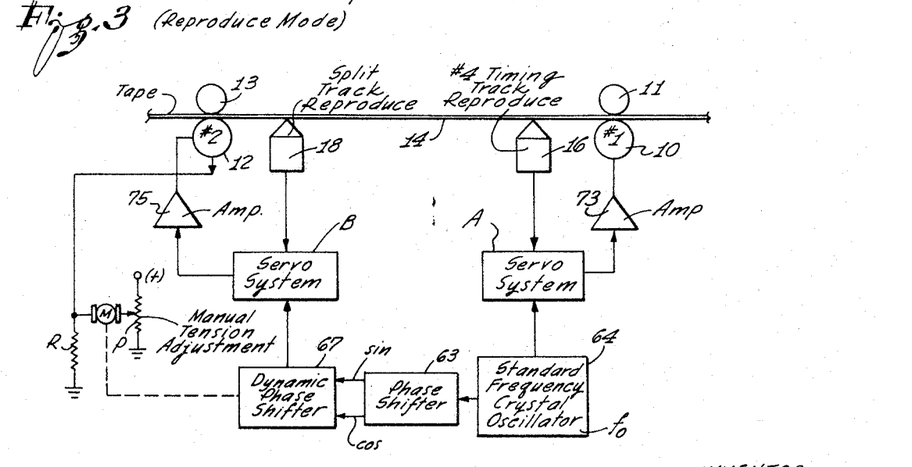
FIGURE 3 is a schematic block diagram representative of the improved control system of the invention, as applied to the dual capstan-type of reproducer, and used to control the speed of the tape during the reproduce mode of the mechanism.

As shown in FIGURE 3, during the reproduce mode, the servo system A responds to the signals from the head 16 which, in this instance, reproduces the timing signal previously recorded on the timing track #4. The servo system A compares the timing signal from the head 16 with the standard frequency signal from the oscillator 64, to provide an appropriate drive for the capstan 10.

Likewise, during the reproduce mode the servo system B responds to the sensing of the split timing track by the reproduce head 18, to compare the phase of the signals produced by the head 18 with a signal derived from a dynamic phase of shifter 67.

Figure 4:
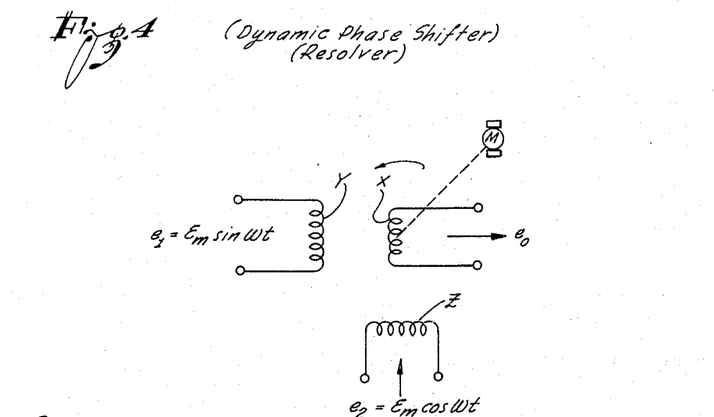
FIGURE 4 is a circuit diagram of one of the components used in the system of FIGURE 3.

For the reproduce mode, the standard signal derived from the oscillator 64 is applied to a phase shifter 63 to derive two quadrature signals (FIGURE 4)

$$e_1 = E_m \sin \omega t \text{ and } e_2 = E_m \cos \omega t$$

These signals are applied to the dynamic phase shifter 67 which may be a usual resolver, as shown in FIGURE 4. This resolver includes a movable coil X which is rotatable in the field of a pair of quadrature coils Y and Z. The angular position of the coil X is controlled by a motor M which, in turn, is controlled by a signal derived from a circuit associated wtih the motor driving the capstan 12, this signal appearing across a grounded resistor R.

A manual tension adjustment for the tape during the record mode may be provided by a potentiometer P which is also connected to the motor M. As mentioned above, during the record mode of the system, the capstan 12 is rotated at a speed slightly less than the capstan 10, as established by an adjustment of the potentiometer P, so as to provide a desired tension on the tape as it is drawn across the heads.

Any variations during the record mode in the tape speed adjacent the capstan drive 12 are reflected by variations in the frequency or phase of the signal sensed by the head 18 during the reproduce mode, and these variations cause the servo system B to produce a compensating control on the motor 12. At the same time, any changes during the reproduce mode in the dynamic tension of the tape between the two drive capstans 10 and 12 are reflected in corresponding changes in the amplitude of the signal appearing across the resistor R. These amplitude changes cause the motor M to turn the coil X in the dynamic phase shifter 67. This in turn changes the phase of the reference signal applied to the servo system B in a direction to produce a compensation in the capstan 12, so as to maintain the tape tension constant during the reproduce mode.

Thus, during the reproduce mode, the servo system B associated with the drive capstan 12 responds to changes in phase of the timing signal in the split track to exert a compensating change in the speed of the tape adjacent the drive capstan 12; and it also responds to variations in dynamic tension of the tape to hold the tension precisely constant.

The servo system A, on the other hand, responds during the reproduce mode to variations in the phase of the timing signal in the timing track #4 adjacent the capstan drive 10 to produce compensation in the capstan drive 10.

Figure 5:
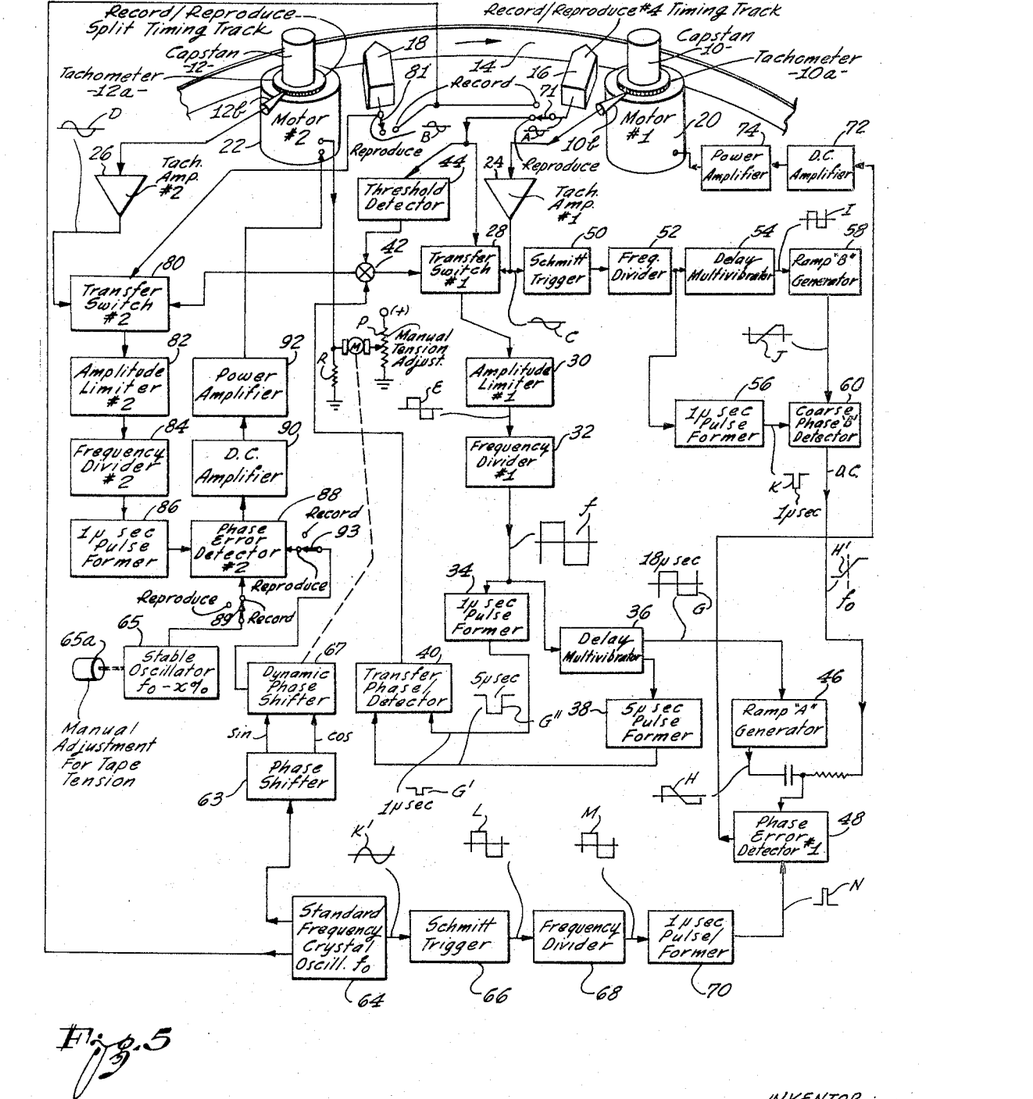
FIGURE 5 is a detailed block diagram of the improved control system of the invention in one of its embodiments.

In the control system of the present invention, and as shown in FIGURE 5, the two capstans 10 and 12 are dynamically controlled in a simultaneous manner from two separate error signal detecting paths. The system of FIGURE 5 includes two separate tachometer signal inputs and two separate tape signal inputs.

The magnetic tape 14 is shown in fragmentary form in FIGURE 5, and it is drawn along a selected path by the capstans 10 and 12. The direction of movement of the tape is assumed to be to the right in FIGURE 5. It will be appreciated that suitable reversing relays may be incorporated into the system to permit the tape 14 to be driven in either direction. The capstan assembly may be constructed in the manner described in copending application Ser. No. 250,084, filed Jan. 8, 1963, in the name of Albert C. Kirilouckas, as referred to above.

The capstan 10, as mentioned, is driven at a slightly higher speed than the capstan 12 during the record mode, so that a tension is placed on the magnetic tape 14, as it is drawn along its path between the two capstans and across the data record and reproduce heads (not shown) of the system. These data heads, as will be understood, are positioned between the capstans 10 and 12, and they may be part of the same head stacks as record/reproduce timing signal heads 16 and 18.

In order to provide the desired control on the tape 14, the pair of control tracks described above are provided along the length of the magnetic tape 14. The head 16 is positioned adjacent the capstan 10, and this head is coupled to one of the control tracks. During the record mode the head 16 records a timing signal on that control track, as described above. The head 18 is positioned adjacent the capstan 12, and this latter head is coupled to the other of the control tracks. During the record mode the head 18 records a timing signal on the latter control track, as also described. Each timing signal in the respective control tracks may be of the form of a continuous wave which is recorded by the heads 16 and 18 at a particular reference frequency.

During the reproduce mode, the head 16 develops an electric signal A in the form, for example, of a sine wave, and of frequency indicative of the speed of the tape 14 in the vicinity of the capstan 10. The sine wave A corresponds to the continuous tape timing signal recorded in the first control track on the tape.

The head 18 develops an electric signal B during the reproduce mode in the form, for example, of a sine wave and of a frequency indicative of the speed of the tape 14 in the vicinity of the capstan 12. The latter electric signal B corresponds to the tape timing signal recorded in the second control track on the tape 14.

The capstan 10 is driven by a motor 20 (motor #1). The motor 20 includes the tachometer 10a which is read by a sensor 10b. The tachometer 10a may be of any known type, magnetic, optical, or the like. The sensor 10b produces a tachometer signal having a frequency representative of the speed of rotation of the capstan 10. The tachometer signal is amplified by an amplifier 24 which produces, for example, a sine wave C at its output terminals.

The capstan 12, on the other hand, is driven by a motor 22 (motor #2). The motor 22 includes the tachometer 12a which is read by a sensor 12b. The sensor 12b produces a signal having a frequency representative of the speed of rotation of the capstan 12. The latter signal is amplified in an amplifier 26 which produces, for example, a sine wave D at its output terminals.

The amplifier 24 is coupled to a transfer switch 28, which will be described in detail in conjunction with FIGURE 8. This switch serves during the reproduce mode under a control to be described, to select either the tachometer signal from the amplifier 24, or the tape control signal from the head 16, as the basis of the servo speed control system. The output of the switch 28 is applied to an amplitude limiter 30 which, in turn, produces a square wave E. The square wave E is applied to a frequency divider 32. A frequency divider 32 may be in the form of a binary counter.

The frequency divider 32 produces a square wave F, which has a lower frequency than the square wave E. The square wave F is applied to a 1 microsecond pulse former circuit 34 (to be described in conjunction with FIGURE 11), and it is applied through a delay multivibrator 36 to a 5 microsecond pulse former circuit 38 (to be described in conjunction with FIGURE 9).

The pulse former 34 produces, for example, a 1 microsecond pulse G' which occurs at the beginning of each cycle of the square wave from the frequency divider 32. The pulse former 38, on the other hand, produces a 5 microsecond pulse G" which is delayed a time $t$ with respect to the 1 microsecond pulse. This time $t$ may be of the order of 18 microseconds, for example.

The system of FIGURE 5 also includes a transfer phase detector 40 (to be described in conjunction with FIGURE 12), which receives pulses from the pulse former circuits 34 and 38. The phase detector 40 develops a particular output when the 1 microsecond pulse G' from the pulse former 34 is in phase with the 5 microsecond pulse G" from the pulse former 38. The output from the transfer phase detector 40 is applied to a summing network 42.

The tape signal output from the head 16 is also applied to an amplitude threshold detector 44. The threshold detector 44 may be of any known type, and it produces direct current output signal which is also applied to the summing network 42. The direct current output signal from the threshold detector 44 increases abruptly from zero to a predetermined value when the amplitude of the tape control signal from the head 16 exceeds a particular threshold.

The output from the summing network 42 is applied to the transfer switch 28. The transfer switch is actuated to switch the system (during the reproduce mode) from the tachometer signal of the amplifier 24 to the tape control signal; this switching occurring only when the tape control signal has an amplitude exceeding a particular threshold (as evidenced by the output of the threshold detector 44), and when a particular tape speed has been achieved (as evidenced by the output from the transfer phase detector 40).

Neither of the above-mentioned outputs alone can actuate the transfer switch. However, once the transfer switch 28 has been actuated, either one of the above-mentioned outputs can hold it in its actuated state. Therefore, so long as the tape speed remains within certain limits, the tape signal will be used as a basis for the control.

The transfer switch 28 is controlled, therefore, to establish whether the tape control signal, or the tachometer signal, will be used to furnish the control for the servo speed control system of the invention.

As mentioned above, the square wave frequency-divided output F from the frequency divider 32 is applied to both the delay multivibrator 36 and to the 1 microsecond pulse former 34. The delay multivibrator is triggered by the positive-going step of the signal F, and it produces two outputs. The first output from the delay multivibrator 36 is applied to the 5 microsecond pulse former 38. This pulse former produces a 5 microsecond pulse, G″, delayed, for example, by 18 microseconds. The second output of the delay multivibrator is a square wave G including a negative step delayed by the same amount. The latter output is applied to a ramp generator 46 (to be described in detail in conjunction with FIGURE 10). The ramp generator 46 produces, in response thereto, a negative-going ramp signal H. This ramp signal is applied to a phase error detector 48 (to be described in detail in conjunction with FIGURE 14).

The output C from the tachometer amplifier 24 is also applied to a Schmitt trigger 50. The output from the Schmitt trigger 50 is applied to a frequency divider binary counter 52. The square-wave frequency-divided output from the frequency divider 52 is applied to a delay multivibrator 54 and to a 1 microsecond pulse former 56 (which may be similar to the pulse former 34).

The multivibrator 54 is triggered by the positive-going step of the square wave from the frequency divider binary counter 52, and it produces a square wave output I having a negative step, delayed, for example, by 18 microseconds. This latter output is applied to a ramp generator 58 (which may be similar to the ramp generator 46). The ramp generator 58 responds to the last-mentioned output to produce a positive-going ramp J. This latter ramp, and the 1 microsecond pulse K from the pulse former 56, are applied to a coarse speed phase detector 60 (to be described in detail in conjunction with FIGURE 13).

It should be noted that the ramp J is delayed, whereas, the pulse K is not. Therefore, when half the period of the output from the frequency divider 52 is equal approximately to the 18 microsecond delay of the ramp J, the pulse K will ride on the ramp. The phase difference between these two signals is a function of the period of the output from the frequency divider 52 which, in turn, is a function of the speed of the capstan 10.

The coarse phase detector 60 produces a direct current output which is a function of the period of the signal from the frequency divider 52 and, thus, of the speed of the capstan 10. This direct current signal drops to a relatively low value when the speed of the capstan 10 is below synchronous speed ($f_0$), and it rises to a relatively high value when the speed of the capstan is above synchronous speed ($f_0$).

The direct current output (H′) from the phase detector 60 serves as a coarse speed control, and it functions to bring the capstan speed within the range of the fine control of the servo control signal. This coarse speed control is a frequency control type, since it depends upon the speed of the system being above or below a selected speed, and it does not depend upon a phase comparison with a standard frequency reference signal.

A system illustrated in FIGURE 5 includes a reference frequency crystal oscillator 64 for establishing a fine speed control. This oscillator may, for example, have a frequency ($f_0$) of 200 kilocycles. The sine wave output K′ from the oscillator 64 is applied to a Schmitt trigger 66. The Schmitt trigger 66 produces a square wave output L which is frequency divided into a binary counter frequency divider 68.

The frequency divided square wave M from the frequency divider 68 is applied to a 1 microsecond pulse former 70. The pulse former 70 may be similar to the pulse former 34, and it applies 1 microsecond clock pulses to the phase error detector 48. These clock pulses sample the direct current signal and the ramp H in the phase detector 48 at reference time intervals.

The phase comparison in the phase detector 48 with the reference clock pulses N is made so as to produce a fine servo speed control for the speed of the motor 20. It will be appreciated that the ramp H will be superimposed on the direct current signal in the phase detector 48, and that the clock pulses will be superimposed on the ramp. The resulting direct current servo signal will assume a particular value as the system approaches synchronous speed, and then the fine control of the clock pulses N in relation with the ramp H will bring the system into a close servo control.

It will be appreciated that when the speed of the system is materially below the selected speed which corresponds to the frequency $f_0$, the direct current voltage curve H′ of FIGURE 6 will be at its low value. The fact that the direct current voltage curve H′ is at its low level, will cause the direct current amplifier 74 to increase the power applied to the motor 20, so that the motor has a tendency to speed up.

Figure 6:
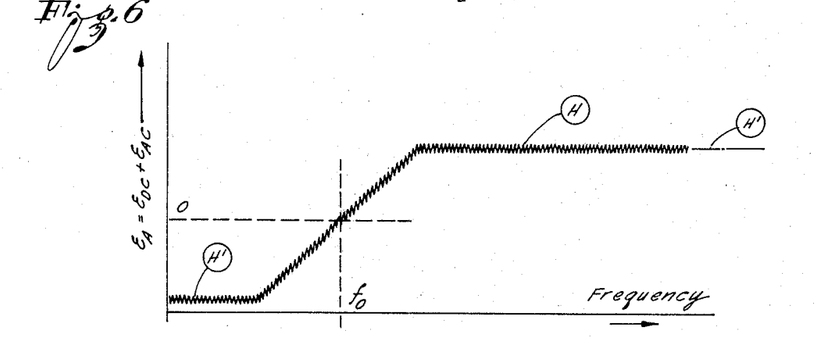
FIGURES 6 and 7 are curves useful in explaining the operation of the system of FIGURE 5.

Conversely, when the system is operating materially above the speed which produces the selected frequency $f_0$, the direct current voltage curve H′ of FIGURE 6 will be at its high level. This causes the error signal applied to the direct current amplifier 72 to decrease, so that the amplifier 74 decreases the power applied to the motor 20, to cause the motor to have a tendency to slow down.

Figure 7:
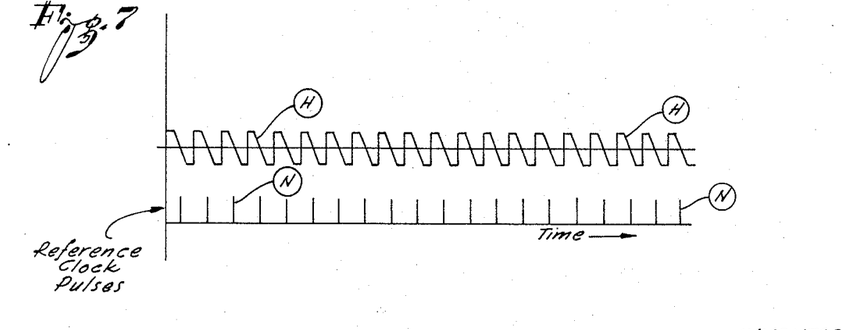

In the manner described in the preceding paragraph, the direct current voltage output from the coarse phase detector 60, as shown by the curve H′ of FIGURE 6, controls the motor 20 to bring it within the range of the fine speed control. When it is in the latter range, the reference clock pulses N of FIGURE 7, derived from the pulse former 70 in FIGURE 5, ride on the sloping portion of the waveform H. Then, so long as the synchronous speed is kept within the range of the fine speed control, any tendency for the speed to change causes the clock pulses N to sample amplitudes up or down the slope of the particular wave H, so as to provide error signals which control the speed of the motor 20 within close limits.

The coarse speed phase detector system described above, therefore, is effective in bringing the speed of the motor 20 into the range of the fine speed control. The fine speed control then provides a precise control for the motor 20, so that it is held at a fixed speed within close tolerances.

A switch 71 is provided for the head 16. When the switch is in the position shown in FIGURE 5, the system is conditioned for the reproduce mode. During that mode, the head 16 senses the timing signal in the #4 timing track on the tape 14, and applies that signal to the transfer switch 28.

When the switch 71 is in its other position, the system is conditioned to the record mode. During that mode, and as described in conjunction with FIGURE 1, the standard frequency signal $f_0$ from the oscillator 64 is applied to the head 16, to be recorded on the timing track #4. During the record mode, the servo system described operates under the control of the tachometer signals derived from the tachometer 10a and amplified in the amplifier 24.

During the reproduce mode, the transfer switch 28 is normally connected to the amplifier 24, to respond to the tachometer signals. However, after the system has been in operation for a time sufficient for the head 16 to sense the timing signals in the #4 timing track on the tape 14, the 1 microsecond pulses from the pulse former 34, as applied to the transfer phase detector 40, apppear substantially in phase with the 5 microsecond pulses from the pulse former 38. This causes the transfer phase detector 40 to produce an output voltage which, in turn, produces a current in the transfer switch 28.

However, this current is insufficient in itself, to actuate the transfer switch. If, at the same time, the head 16 senses a timing signal in the timing track #4, the resulting output from the threshold detector 44 produces an additional current in the transfer switch 28. This additional current is sufficient to operate the transfer switch 28. Then, the servo system, during the reproduce mode, responds to the timing signal derived from the tape 14 by way of the head 16, instead of the less accurate tachometer signal derived from the tachometer 10a.

As mentioned above, the motor 22 is driven at a slower speed than the motor 20 during the record mode, so that an appropriate tension may be exerted on the tape 14 as it is drawn between the two capstans 10 and 12. The motor 22 is controlled during the reproduce mode by a servo system which includes a transfer switch 80 which may be similar to the transfer switch 28, described above.

During the reproduce mode, the input to the transfer switch 80 receives signals from the tachometer amplifier 26, and from the head 18. A switch 81 is included in the circuit which, in the illustrated embodiment, conditions the circuit to the reproduce mode. When the switch 81 is placed in the other position, the circuit is conditioned for the record mode, during which the standard frequency from the oscillator 64 is recorded by the head 18 on the split track, as mentioned above.

The output from the transfer switch 80 during the reproduce mode is applied to an amplitude limiter 82, and the amplitude limited output is applied through a frequency divider 84 to a 1 microsecond pulse former 86. These components 82, 84 and 86 may be similar to the corersponding respective components 30, 32 and 34.

The transfer switch 80 responds to the output from the summing network 42. Therefore, when the conditions are such that the transfer switch 28 causes the servo system for the motor 20 (during the reproduce mode) to respond to the timing signals from the head 16; the transfer switch 80, at the same time, causes the control of the servo system associated with the motor 22 (during the reproduce mode) to respond to the timing signal derived from the head 18.

The pulse former 86 applies its output to a phase error detector 88 which may be similar to the phase error detector 48. The aforementioned stable oscillator 65 is connected through a switch 89 to the error detector 88. The switch 89 is in the illustrated position during the record mode, so that the phase detector may compare the pulses from the pulse former 86 with the output from the stable oscillator 65. The resulting error signal is amplified in the direct current amplifier 90 and is applied to the motor 22 through a power amplifier 92. These latter amplifiers may be similar to the amplifiers 72 and 74, respectively.

Therefore, during the record mode, and in the manner described in FIGURE 1, the power applied to the motor 22 is under the control of the stable oscillator 65. This power can be increased or decreased manually, by the adjustment 65a, so as to produce a desired tension for the tape 14.

During the reproduce mode, the dynamic phase shifter 67 is connected to the phase error detector 88 through a switch 93. The switch 93 is in its illustrated position during the reproduce mode. Then, the control of the motor 22 proceeds in the manner described in conjunction with FIGURE 3.

Figure 8:
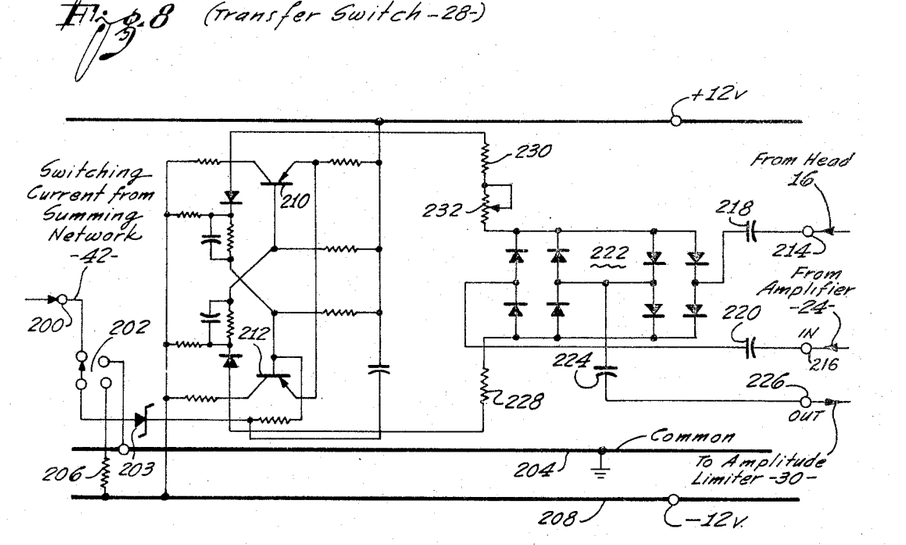
FIGURES 8–14 are circuit diagrams of the various components shown in block form in the system of FIGURE 5.

The circuit details of the tape transfer switch 28 of FIGURE 5 are shown in FIGURE 8. The input terminal 200 of the switch receives the switching current $i$ from the summing network 42 of FIGURE 5. The terminal 200 is connected to a manually operable switch 202 which has three distinct positions.

In a first position of the switch 202, the input terminal 200 is connected to the anode of a Zener diode 203 for normal operation of the transfer switch.

In a second position of the switch 202, the anode of the Zener diode is connected to a common lead 204 for connecting the output terminal of the transfer switch to the reproduce head 16. For this position of the switch, only the signals from the reproduce head 16 are passed by the transfer switch 28.

For a third position of the switch 202, the anode of the diode 202 is connected to a resistor 206 for connecting the output terminal of the transfer switch 28 to the output of the tachometer amplifier 24, as for the record mode.

The resistor 206 may have a resistance of 10 kilo-ohms, and it is connected to a common lead 208. The common lead 208 is connected to the negative terminal of a 12- volt direct voltage source, whereas the common lead 204 is connected to a point of reference potential, such as ground.

The transfer switch 28 of FIGURE 8 includes a pair of PNP transistors 210 and 212. The transistors are connected in a monostable type of multivibrator circuit. When the switch 202 is set to its normal position, the circuit of the transistors 210 and 212 is such that the transistor 210 is conductive (saturated), and the transistor 212 is non-conductive (cut-off). The multivibrator remains in this state until a switching current $i$ of sufficient amplitude is received from the summing network 42 to cause the multivibrator to assume its second unstable state.

In its second state, the conductivity of the transistors 210 and 212 is reversed. The multivibrator is held in its unstable state, when the switch 202 is in its first position, so long as the switching current $i$ exceeds a predetermined threshold.

When the switch 202 is moved from its first position, as described in the preceding paragraph, to either one of its two positions, the multivibrator circuit formed by the transistors 210 and 212 is caused to assume one or the other of its two states. The multivibrator remains in the particular state so long as the switch 202 is left in the corresponding position.

The transfer switch circuit 28 of FIGURE 8 includes a further input terminal 214 which is connected to the head 16. The circuit also includes a further input terminal 216 which is connected to the tachometer amplifier 24. These latter input terminals are connected through coupling capacitors 218 and 220 to a diode switching network 222. Each of these capacitors may have a capacity, for example, of 1 microfarad.

The diode switching network is coupled through a .1 microfarad capacitor 224 to an output terminal 226. The output terminal 226 is connected to the amplitude limiter 30 of FIGURE 5.

The collectors of the transistors 210 and 212 are connected through resistors 228 and 230 to the diode switching network 222. A balancing potentiometer 232 is included in the circuit with the resistor 230. The resistor 228 may, for example, have a resistance of 6.8 kilo-ohms, and a resistor 230 may have a resistance of 3.3 kilo-ohms.

The transfer switch 28 of FIGURE 8 operates to cause the diode network 222 selectively to couple the input terminal 214, or the input terminal 216, to the output terminal 226. This control is effected by the corresponding state of the multivibrator formed by the transistors 210 and 212.

As mentioned above, under the control of the switching current $i$ at the input terminal 200, the multivibrator is actuated between its two conditions, so as to cause the diode switching network to be operated correspondingly.

The manual switch 202 can be controlled to hold the multivibrator in either of its two states, as mentioned above. This provides for a continuous connection between the transducer head 16 and the amplitude limiter 30, or between the tachometer amplifier 24 and the amplitude limiter 30.

Figure 9:
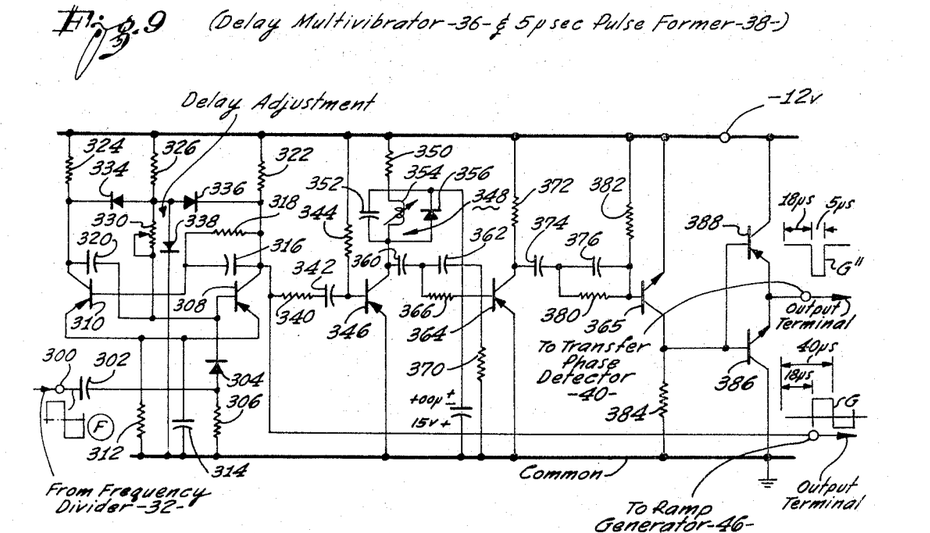

The delay multivibrator 36 and 5 microsecond pulse former network 38 are shown in circuit detail in FIGURE 9. The overall network of FIGURE 9 includes an input terminal 300 which receives the square wave A from the frequency divider 32. The terminal 300 is connected to a coupling capacitor 302 which, in turn, is connected to the anode of a diode 304 and to a grounded resistor 306. The coupling capacitor 302 may have a capacity of 270 micro-microfarads, and the resistor 306 may have a resistance of 10 kilo-ohms.

The cathode of the diode 304 is connected to the base of a transistor 308. The transistor 308 and a second transistor 310 are connected as a multivibrator circuit. Both of these transistors may be of the PNP type, and they may be of the type presently designated as Fairchild 2N995.

The emitters of the transistors 308 and 310 are connected to a common grounded resistor 312 which is shunted by a capacitor 314. The resistor 312 may have a resistance of 220 ohms, and the capacitor 314 may have a capacity of .003 microfarad.

The collector of the transistor 308 is connected to the base of the transistor 310 through a capacitor 316. The capacitor 316 may have a capacity of 150 micro-microfarads, and it is shunted by a 6.8 kilo-ohm resistor 318. The collector of the transistor 310 is coupled to the base of the transistor 308 through a capacitor 320 which may, for example, have a capacity of .003 microfarad.

The collectors of the transistors 308 and 310 are connected to the negative terminal of the 12-volt source through respective resistors 322 and 324, each having a resistance of 1.5 kilo-ohms. The base electrode of the transistor 308 is connected to the negative terminal through resistor 326 and through a series potentiometer 330 which serves as an adjustment for the delay characteristics of the circuit. The resistor 326 may have a resistance of 1 kilo-ohm, and the potentiometer 330 may have a resistance of 5 kilo-ohms.

Ths common junction of the resistors 326 and 330 is connected to the anodes of respective diodes 334 and 336, the cathodes of which are connected back to the collectors of the respective transistors 310 and 308. A Zener diode 338 is connected from the anodes of the diode 334 and 336 to ground.

The collector of the transistor 308 is connected to a resistor 340 which, in turn, is connected through a capacitor 342 to a resistor 344 and to the base of a PNP transistor 346. The resistor 340 may have a resistance of 1 kilo-ohm, and the capacitor 342 may have a capacity of .01 microfarad. The resistor 344 is connected to the negative terminal of the 12-volt source, and it may have a resistance of 47 kilo-ohms.

The transistor 346 may be of the PNP type, and its emitter is connected to ground. The collector of the transistor 346 is connected through a parallel resonant ringing circuit 348 and through a resistor 350 to the negative terminal of the 12-volt source. The resistor 350 may have a resistance, for example, of 1.5 kilo-ohms.

The resonant circuit 348 includes a capacitor 352 and a shunting variable inductance coil 354. These two elements are shunted by a diode 356. The capacitor 352 may have a capacity of 470 micro-microfarads, and the variable inductance coil 354 may have an inductance of 4-5 microhenries. The inductance coil is made adjustable, so as to adjust the width of the pulse formed by the pulse forming circuit of FIGURE 9.

The collector of the transistor 346 is coupled through a pair of capacitors 360 and 362 to the base electrode of a transistor 364. The capacitor 360 may have a capacity of .01 microfarad, and the capacitor 362 may have a capacity of 330 micro-microfarads. The capacitor 362 is shunted by a 10 kilo-ohm resistor 366.

The multivibrator formed by the transistors 308 and 310 is triggered by the positive-going edges of the square wave A, and the multivibrator generates a series of output pulses in response thereto, each having a width determined by the setting of the potentiometer 330. The trailing edges of the latter pulses cause the transistor 346 to be cut off so as to shock excite the resonant circuit 348. The diode 356 damps the signal across the resonant circuit 348 after the first half cycle, so that a series of delayed pulses are produced across the resonant circuit.

The transistor 364 and a further transistor 365 are connected as pulse amplifiers and shaper networks. The base of the transistor 364 is connected to a grounded 10 kilo-ohm resistor 370, and the emitter of the transistor is grounded. The transistor 364 is of the PNP type, and its collector is connected through a 1.5 kilo-ohm resistor 372 to the negative terminal of the 12-volt source.

The collector of the transistor 364 is also connected through a pair of capacitors 374 and 376 to the base of the transistor 365. The latter transistor is of the NPN type. The capacitor 376 is shunted by a 1 kilo-ohm resistor 380. The capacitor 374 may have a capacitiy of .01 microfarad, and the capacitor 376 may have a capacity of 390 micro-microfarads.

The base of the NPN transistor 365 is connected through a 10 kilo-ohm resistor 382 to the negative terminal of the 12-volt source, and the emitter of the transistor is directly connected to that terminal.

The collector of the transistor 365 is connected to a 1.5 ohm grounded resistor 384 and to the base of a pair of transistors 386 and 388. These latter transistors are connected as complementary emitter followers, so as to provide a low impedance drive for both positive and negative outputs. The transistor 386 is of the NPN type, and the transistor 388 is of the PNP type. The collector of the transistor 388 is connected to the negative terminal of the 12-volt source, and the collector of the transistor 386 is grounded.

The output terminal for the circuit is connected to the common emitters of the transistors 386 and 388. The delayed 5 microsecond pulses are produced at the output terminals, and are applied at the transfer phase detector 40.

Figure 10:
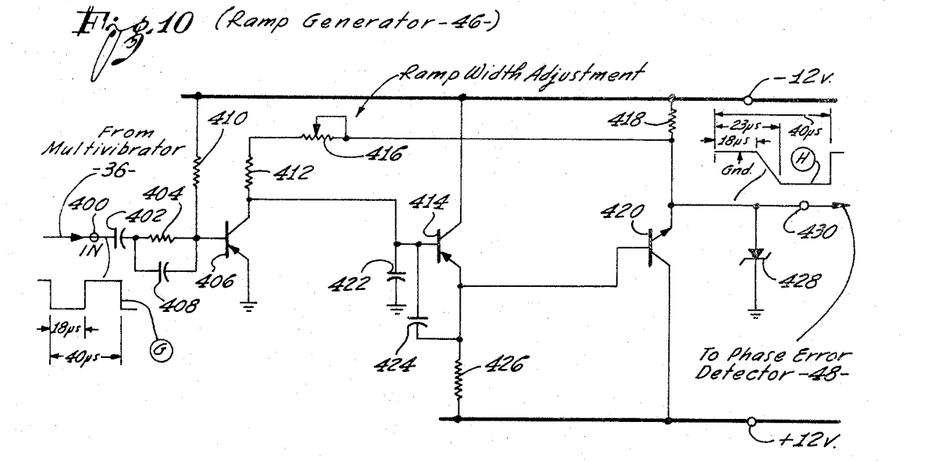

The ramp generator 46 is shown in FIGURE 10, and this circuit includes an input terminal 400 which receives the pulses from the multivibrator 36. This multivibrator is connected to a second output terminal in the circuit of FIGURE 9, and the input terminal 400 may be connected to that output terminal.

The input terminal 400 of the ramp generator 46 of FIGURE 10 is connected to a coupling capacitor 402 which has a capacity of 1 microfarad. The coupling capacitor 402 is connected through a 1 kilo-ohm resistor 404 to the base of a grounded PNP transistor 406. The resistor 404 is shunted by a 1,000 micro-microfarad capacitor 408.

The base of the transistor 406 is connected to the negative terminal of the 12-volt source through a 47 kilo-ohm resistor 410.

The collector of the transistor is connected to a 910 ohm resistor 412 and to the base of a PNP transistor 414. The resistor 412 is connected to a 250 ohm potentiometer 416 which serves as a ramp width adjustment. The potentiometer is connected to the junction of a 1 kilo-ohm resistor 418 and the emitter of an NPN transistor 420. The resistor 418 has a resistance, for instance, of 1 kilo-ohm.

The base of the transistor 414 is connected to a grounded capacitor 422 which has a capacity, for example, of 510 micro-microfarads. A 330 micro-microfarad capacitor 424 is connected between the base and the emitter of the transistor 414.

The emitter of the transistor 414 is connected to a 10 kilo-ohm resistor 426 and to the base of the transistor 420. The resistor 426 and the collector of the transistor 420 are connected to the positive terminal of the 12-volt source.

The emitter of the transistor 420 is connected to the anode of a Zener diode 428 and to an output terminal 430. The cathode of the Zener diode is grounded.

The capacitor 422 forms the main circuit element of the ramp generator. This capacitor is normally in a discharged state, as the transistor 406 is normally biased to its fully conductive saturated condition. However, for each delayed pulse G applied to the input terminal 400, the transistor 406 is driven to cut-off, and the capacitor 422 begins to charge. The circuit including the resistor 412 and potentiometer 416 forms a boot-strap feedback network to linearize the voltage developed across the capacitor 422 as it charges up. The transistors 414 and 420 serve as emitter followers, and the Zener diode 428 serves as a clamp.

The circuit of FIGURE 10 therefore responds to the delay pulses from the multivibrator 36 to produce the ramp signal H at its output terminal 430. The width of the ramp can be adjusted by appropriate adjustment of the potentiometer 416.

Figure 11:
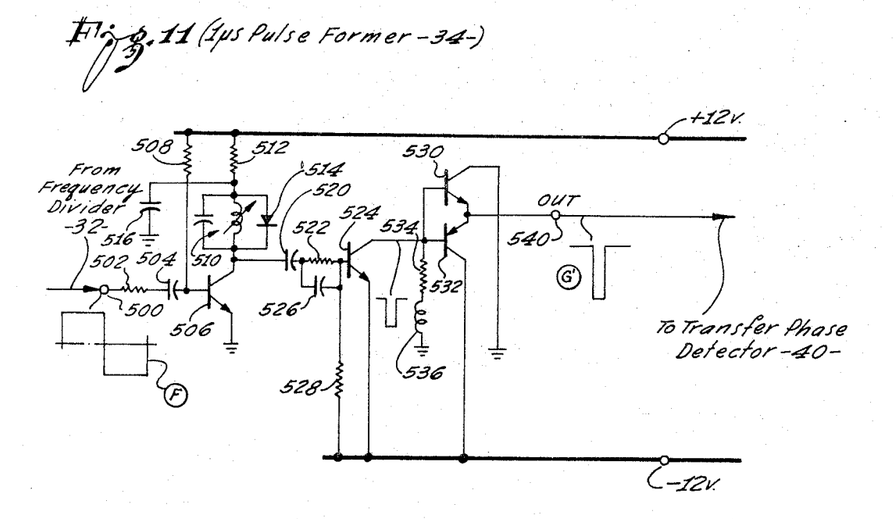

The 1 microsecond pulse former network 34 is shown in FIGURE 11. This latter network includes an input terminal 500 which, for example, receives the square wave F from the frequency divider 32. The input terminal 500 is connected to a 470 ohm resistor 502 which, in turn, is coupled through a .01 coupling capacitor 504 to the base of a NPN transistor 506 and to a 47 kilo-ohm resistor 508. The resistor 508 is connected to the positive terminal of the 12-volt source.

The emitter of the transistor 506 is grounded, and its collector is connected through a parallel resonant ringing circuit 510 to a resistor 512. The resistor 512 has a resistance of 1.5 kilo-ohms, for example, and it is connected to the positive terminal of the 12-volt source. The resonant ringing circuit 510 is shunted by a diode 514. A grounded 33 microfarad capacitor 516 is connected to the junction of the resistor 512 and the resonant circuit 510.

The circuit of FIGURE 10 thus far described responds to the square wave input circuit to shock excite the resonant circuit 510 for each positive-going half cycle of the square wave input signal. However, the diode 514 damps the tuned circuit 510 at the end of the first half cycle, so that a sharp pulse is produced in the output circuit of the transistor 506 for each positive-going half cycle of the square wave input.

The collector of the transistor 506 is connected through a coupling capacitor 520 of, for example, .01 microfarad and through a 4.7 kilo-ohm resistor 522 to the base of an NPN transistor 524. The resistor 522 is shunted by a 120 micro-microfarad capacitor 526.

The base of the transistor 524 is connected to a 10-kilo-ohm resistor 528 which, in turn, is connected to the negative terminal of the 12-volt source. The emitter of the transistor 524 is connected directly to the negative terminal.

The collector of the transistor 524 is connected to the base electrodes of a pair of transistor 530 and 532. The transistor 530 is of the NPN type and has a grounded collector, and the transistor 532 is of the PNP type and has a collector connected to the negative terminal of the 12-volt source. The base of the transistor 532 is connected to a 1.5 kilo-ohm resistor 534 which, in turn, is connected to a grounded inductance coil 536 which may, for example, have an inductance of 200 microhenries. The emitters of the transistors 530 and 532 are connected to an output terminal 540 at which the 1 microsecond pulses G' appear.

The pulse forming network of FIGURE 11 is essentially similar to the pulse forming network in the circuit of FIGURE 9. The square wave F from the frequency divider is applied to the input terminal 500, and this square wave periodically renders the transistor 506 non-conductive. Each time the transistor 506 is swung to its non-conductive state, a shock excited signal appears across the ringing circuit 510. However, the diode 514 damps out the signal after its first half cycle. Therefore, a series of pulses appear across the resonant circuit 510.

The transistor 524 acts as a pulse amplifier and pulse shaper circuit, and the transistors 530 and 532 are connected as a symmetrical emitter follower circuit. Therefore, a corresponding series of sharp pulses G', each having a duration, for example, of 1 microsecond, appears at the output terminal 540 for application to the transfer phase detector 40.

Figure 12:
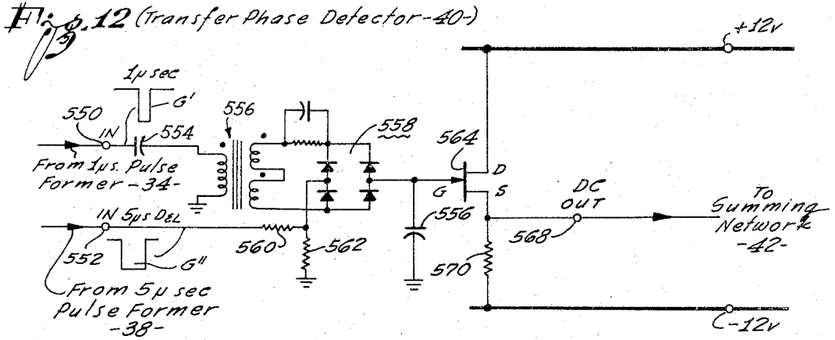

The pulses from the pulse forming circuit 34 of FIGURE 11, and from the pulse forming circuit 38 of FIGURE 9, are applied to the respective input terminals 550 and 552 of the transfer phase detector circuit 40 of FIGURE 12.

The input terminal 550 is connected through a coupling capacitor 554 to the primary winding of a transformer 556. The transformer 556 has a pair of secondary windings which are connected together and to a usual phase discriminator circuit 558.

The input terminal 552 is connected through a resistor 560 to a grounded resistor 562, the common junction of these resistors being connected to a pair of diodes in the phase discriminator circuit 558. The output from the phase discriminator 558 is connected to the gate electrode G of a field effect transistor 564 and to a grounded capacitor 566.

The source electrode S of the field effect transistor 564 is connected to an output terminal 568, whereas the drain electrode D is connected to the positive terminal of the 12-volt source. The source electrode S is also connected to a resistor 570 which is connected to the negative terminal of the 12-volt source. The transfer phase detector 40 produces a direct current output at the output terminal 568, which, as described above, is applied to the summing network 42.

It will be remembered that only when the input pulses applied to the respective input terminals 550 and 552 are in phase, does the transfer phase detector circuit 40 produce sufficient current at its output terminal 568 to combine with the current from the threshold detector 44 of FIGURE 5 to actuate the transfer switch 28.

Figure 13:
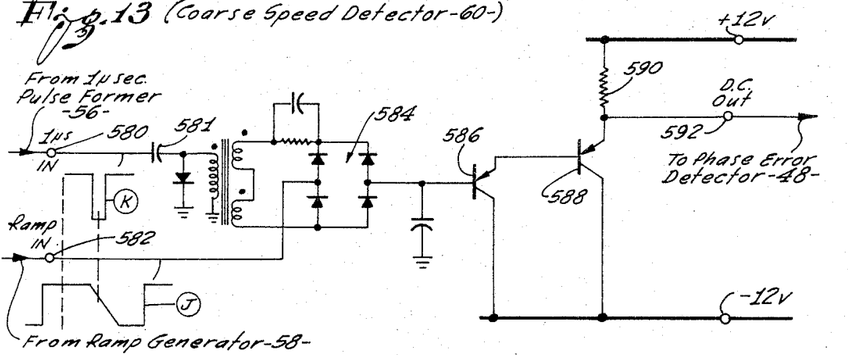

The coarse speed detector 60 is shown in FIGURE 13, and this detector includes a first input terminal 580 which receives the 1 microsecond pulse from the pulse former 56, and it includes a second input terminal 552 which receives the ramp signals from the ramp generator 58.

The input terminal 580 is coupled through a capacitor 581 to a usual phase detector 584. The input terminal 582 is connected to a pair of diodes in the phase detector circuits. The output from the phase detector 584 is applied to a PNP transistor 586 which is coupled to a PNP transistor 588. The collector is connected to the negative terminal of the 12-volt source, and the emitter is connected through resistor 590 to the positive terminal. The direct current output from the coarse speed detector 60 is derived at the output terminal 592 connected to the emitter of the transistor 588, and this output is applied to the phase error detector 48.

Figure 14:
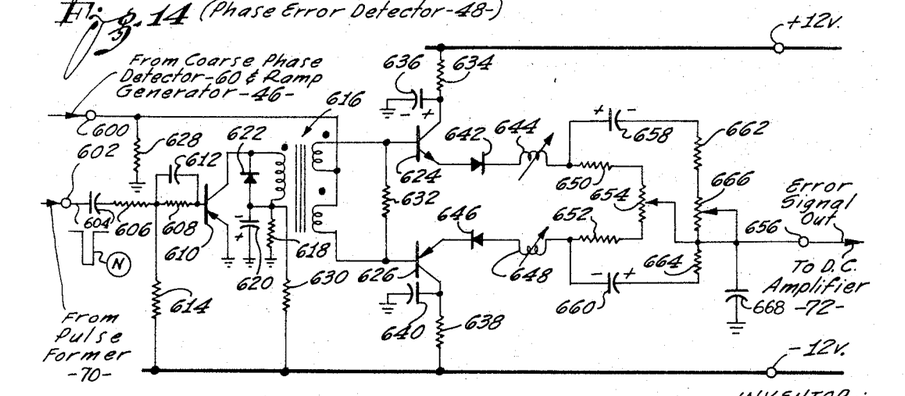

The phase error detector 48 is shown in circuit detail in FIGURE 14. The detector includes a first input terminal 600 which receives the input from the coarse phase detector 60 and from the ramp generator 46. The phase error detector 48 also includes a second input terminal 602 which receives the one microsecond pulses from the pulse former 70.

The input terminal 602 is connected to a capacitor 604 which, in turn, is connected through a pair of resistors 606 and 608 to the base of a PNP grounded emitter transistor 610. The capacitor 604 may have a capacity of 1 microfarad, the resistor 606 may have a resistance of 560 ohms, and the resistor 608 may have a resistance of 2.4 kilo-ohms. The resistor 608 is shunted by a capacitor 612 which may have a capacity of 1,000 micro-microfarads, and the junction of the resistors 606 and 608 is connected to a 240 kilo-ohm resistor 614.

The collector of the transistor 610 is connected to the primary winding of a transformer 616. The other terminal of this winding is connected to a grounded 20 kilo-ohm resistor 618 which is shunted by a capacitor 620. The primary winding is shunted by a diode 622.

The transformer 616 has a pair of secondary windings which are connected together and to the base electrodes of a pair of transistors 624 and 626. The transistor 624 is of the NPN type, and the transistor 626 is of the PNP type.

The input terminal 600 is connected to a 1 kilo-ohm grounded resistor 628 and to the common junction of the secondary windings of the transformer 616. The primary of the transformers 616 is also connected to a 3.3 kilo-ohm resistor 630 which is connected to the negative terminal of the 12-volt direct voltage source.

The base electrodes of the transistors 624 and 626 are interconnected by a 3.9 kilo-ohm resistor 632. The collector of the transistor 624 is connected through a 100 ohm resistor 634 to the positive terminal of the 12-volt source. This collector is also connected to a 100 micro-microfarad grounded capacitor 636.

The collector of the transistor 626 is connected to a 100 ohm resistor 638 which, in turn, is connected to the negative terminal of the 12-volt direct voltage source. This latter collector is also connected to a 100 micro-microfarad grounded capacitor 640.

The emitter of the transistor 624 is connected through a diode 642 to a variable inductance coil 644. The emitter of the transistor 626 is connected through a diode 646 to a variable inductance coil 648. Each of the inductance coils 644 and 648 has an inductance of from 1.8–3.6 microhenries.

The inductance coil 644 is connected to a 1.2 kilo-ohm resistor 650, and the inductance coil 648 is connected to a like resistor 652. These resistors are connected to a 3.9 kilo-ohm potentiometer 654, the arm of which is connected to an output terminal 656.

The inductance coils 644 and 648 are also connected to respective 22 micro-microfarad capacitors 658 and 660. These capacitors are connected to respective 16 ohm resistors 662 and 664. These latter resistors are connected to a 20 ohm potentiometer 666, the arm of which is also connected to the output terminal 656. A .02 microfarad grounded capacitor 668 is connected to the output terminal.

The phase-error detector of FIGURE 14 operates in a known manner to produce an error signal at the output terminal 656 whenever the phase of the input signals applied to its input terminals 600 and 602 departs from a predetermined relationship. This error signal is applied to a direct current amplifier 72 so as to control the motor 20, as described above.

The invention provides, therefore, an improved system for controlling the drive of a magnetic tape, or the like. The improved system of the invention, as described, permits a low inertia drive system to be used, and yet assures that the tape will be drawn at constant speed past the transducer heads.

The improved system of the invention, as described, is intended to be used in a dual capstan type of tape recorder/reproducer, and it provides for a precise and accurate control for both capstans, so that the tape is drawn past the transducer heads of the system in a manner such that the normal errors produced due to flutter, or the like, are reduced to an absolute minimum.

While a particular embodiment of the invention has been shown and described, modifications may be made. It is intended in the claims to cover such modifications which fall within the scope of the invention.

What is claimed is:

1. A system for controlling the speed and tension of a magnetic tape, comprising:

a first drive means for said tape to impart movement thereto;

a second drive means for said tape spaced apart from said first drive means, said first and second drive means together imparting a tension to said tape;

a first transducer means positioned adjacent said first drive means and coupled to a first track on said magnetic tape for passing a timing signal with respect to said first track;

a second transducer means positioned adjacent said second drive means and coupled to a second track on said magntic tape for passing a timing signal with respect to said second track;

a first servo system coupled to said first transducer means and responsive to signals therefrom for adjusting the speed of said first drive means in response to said signals;

a second servo system coupled to said second transducer means and responsive to signals therefrom for adjusting the speed of said second drive means in response to said signals;

a source of reference pulses coupled to said first and second servo systems;

a regulating means coupled to said second drive means and responsive to signals therefrom representing variations in the tension of said magnetic tape between said two drive means from a predetermined value, said regulating means also coupled to said second servo means for regulating the amount of speed adjustment provided by said second servo means in response to a predetermined signal from said second transducer means, whereby said first and second servo means and said regulating means together provide uniformity of tape speed and tension between recording and playback.

2. A system for controlling the speed and tension of a magnetic tape comprising:

a first drive means for said tape to impart movement thereto;

a second drive means for said tape spaced apart from said first drive means, said first and second drive means together imparting a tension to said tape;

a first transducer means positioned adjacent said first drive means and coupled to a first track on said magnetic tape for passing a timing signal with respect to said first track;

a second transducer means positioned adjacent said second drive means and coupled to a second track on said magnetic tape for passing a timing signal with respect to said second track;

a first servo system coupled to said first transducer means and responsive to signals therefrom for adjusting the speed of said first drive means in response to said signals;

a second servo system coupled to said second transducer means and responsive to signals therefrom for adjusting the speed of said second drive means in response to said signals;

a source of reference pulses coupled to said first and second servo systems;

a signal generating means for generating a signal representative of the dynamic tension of magnetic tape between said two drive means;

a regulating means coupled to said second servo means for regulating the amount of speed adjustment provided in response to a predetermined signal from said first transducer, said regulating means also coupled to said signal generating means and responsive to signals therefrom, whereby said first and second servo means and said regulating means together provide uniformity of tape speed and tension between recording and playback.

3. The system recited in claim 2 wherein said first timing signal is recorded on said magnetic tape at a position corresponding to the position of said first transducer means, and said second timing signal is simultaneously recorded on said magnetic tape at a position corresponding to the position of said second transducer means.

4. The control system recited in claim 3 wherein said regulating means includes a dynamic phase shifter means interposed between said reference source and said second servo system, and a motor means electrically coupled to said signal generating means and mechanically coupled to said dynamic phase shifter means to exert a mechanical control on the reference signal applied to said second servo system in response to changes in tension in said tape between said two drive means.

5. A speed control system for a magnetic tape comprising: first and second capstan drive means spaced from one another along a path for drawing the tape along said path; a first electromagnetic transducer means positioned adjacent said first drive means and adjacent the path of said tape to be magnetically coupled to a first track on said tape for sensing a first timing signal in said first track; a second electromagnetic transducer means positioned adjacent said second drive means and adjacent the path of said tape and spaced along said path from said first transducer means to be coupled to a second track on said tape for sensing a second timing signal in said second track; a first control circuit means coupled to said first transducer means and to said first drive means for controlling said first drive means in response to said first timing signal; a second control circuit means coupled to said second transducer means and to said second drive means for controlling said second drive means in response to said second timing signal; a standard reference frequency signal source coupled to said first and second control circuit means; a motor means coupled to said second drive means and responsive to signals therefrom representing changes in tape tension; and a dynamic phase shifter means coupled to said motor means and interposed between said reference source and said second control circuit for regulating the amount of speed adjustment provided by said second control means in response to a predetermined signal from said first transducer means; whereby said first and second control circuit means, said regulating motor means, and said dynamic phase shifter means together provide uniformity of tape speed and tension between recording and playback.

6. A speed control system for a movable record member, comprising: a movable record member having a first timing signal of a predetermined frequency recorded on said record member at a position corresponding to the position of a first transducer means and a second timing signal of a predetermined frequency simultaneously recorded on said record member at a position corresponding to the position of a second transducer means; said first transducer means positioned adjacent the path of said record member to be coupled to said record member so as to be responsive to said first timing signal so as to produce a first control signal of a predetermined frequency representative of the speed of the record member as it is drawn past said first transducer means; said second transducer means positioned adjacent the path of said record member in spaced relationship along said path with said first transducer means and coupled to said record member to be responsive to said second timing signal so as to produce a second control signal of a particular frequency representative of the speed of the record member as it is drawn past said second transducer means; a first drive means for said record member positioned adjacent said first transducer means for driving said record member; a second drive means for said record member positioned adjacent said second transducer means for maintaining a predetermined tension in said record member between said first and second transducer means; a first control system electrically coupled to said first transducer means and to said first capstan drive means for controlling the speed of said first capstan drive means in response to said first control signal; and, a second control system electrically coupled to said second transducer means and to said second drive means for controlling the speed of said second drive means in response to said second control signal.

7. A speed control system for a magnetic tape recorder/reproducer for controlling the speed of a magnetic tape comprising: a magnetic tape having a first timing signal of a predetermined frequency recorded thereon in a first track and having a second timing signal of a predetermined frequency recorded thereon in a second track, a first transducer means positioned adjacent the path of said tape and coupled to said first track to be responsive to said first timing signal to produce a first control signal of a particular frequency representative of the speed of said tape as it is drawn past said first transducer means; a second transducer means positioned adjacent the path of said tape in spaced relationship with said first transducer means and coupled to said second track to be responsive to said second timing signal so as to produce a second control signal of a particular frequency representative of the speed of the tape as it is drawn past said second transducer means; a first capstan drive means for said tape positioned adjacent said first transducer means for driving said tape; a second capstan drive means for said tape positioned adjacent said second transducer means for maintaining a particular tension on said tape between said first and second transducer means; a first servo system electrically coupled to said first transducer means and to said first capstan drive means for controlling the speed of said first capstan means in accordance with the phase of said first control signal; a second servo system electrically coupled to said second transducer means and to said second capstan drive means for controlling the speed of said second capstan drive means in accordance with the phase of said second control signal; a reference frequency signal source for supplying a reference signal to said second servo system for comparison with said second control signal, so as to provide a control for said second capstan drive means dependent upon differences between said reference signal and said control signal; a dynamic phase shifter means interposed between said standard frequency source and said second servo system; and a motor means mechanically coupled to said dynamic phase shifter means and electrically coupled to said second capstan drive means to exert a mechanical control on the reference signal applied to said second servo system in response to changes in tension in said tape at said second capstan drive means.

References Cited

UNITED STATES PATENTS

| | | | |
|---|---|---|---|
| 2,828,459 | 3/1958 | Pear | 318—318 |
| 2,985,396 | 5/1961 | Johnson | 318—7 |

ORIS L. RADER, *Primary Examiner.*

B. A. COOPER, *Assistant Examiner.*